(12) United States Patent
Kanai et al.

(10) Patent No.: US 11,188,238 B2
(45) Date of Patent: Nov. 30, 2021

(54) INFORMATION PROCESSING APPARATUS, MEMORY CONTROL METHOD, AND COMPUTER PROGRAM PRODUCT

(71) Applicant: KABUSHIKI KAISHA TOSHIBA, Minato-ku (JP)

(72) Inventors: Tatsunori Kanai, Yokohama (JP); Yusuke Shirota, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 412 days.

(21) Appl. No.: 16/286,786

(22) Filed: Feb. 27, 2019

(65) Prior Publication Data

US 2020/0081634 A1     Mar. 12, 2020

(30) Foreign Application Priority Data

Sep. 12, 2018   (JP) .............................. JP2018-170576

(51) Int. Cl.
  *G06F 3/06*       (2006.01)
(52) U.S. Cl.
  CPC .......... *G06F 3/0622* (2013.01); *G06F 3/0631* (2013.01); *G06F 3/0679* (2013.01)
(58) Field of Classification Search
  CPC .............................................. G06F 3/06–0689
  See application file for complete search history.

(56) References Cited

U.S. PATENT DOCUMENTS

2017/0228155 A1* 8/2017 Shirota ................. G06F 3/0655
2019/0286347 A1   9/2019 Kanai et al.

FOREIGN PATENT DOCUMENTS

| EP | 0238158 A2 * | 9/1987 | ........... G06F 9/4843 |
| JP | 2017-138852 | 8/2017 | |
| JP | 2019-164411 A | 9/2019 | |

* cited by examiner

*Primary Examiner* — Nicholas J Simonetti
(74) *Attorney, Agent, or Firm* — Oblon, McClelland, Maier & Neustadt, L.L.P.

(57) ABSTRACT

An information processing apparatus according to an embodiment includes a first memory, a non-volatile memory, and one or more processors. The processor is configured to execute information processing on data stored in those memories. The processor allocates, to each of pages included in a file stored in the non-volatile memory by executing an operating system, a memory access method that indicates either copy access processing or direct access processing to be executed. The copy access processing performs writing and readout of data copied from the non-volatile memory into the first memory. The direct access processing directly performs writing and readout of data stored in the non-volatile memory. The processor accesses those memories by the memory access method allocated to each of the pages included in the file when the operating system receives a request from an application program for writing or readout on the file.

9 Claims, 10 Drawing Sheets

INFORMATION PROCESSING APPARATUS, MEMORY CONTROL METHOD, AND COMPUTER PROGRAM PRODUCT

CROSS-REFERENCE TO RELATED APPLICATIONS

This application is based upon and claims the benefit of priority from Japanese Patent Application No. 2018-170576, filed on Sep. 12, 2018, the entire contents of which are incorporated herein by reference.

FIELD

Embodiments described herein relate generally to an information processing apparatus, a memory control method, and a computer program product.

BACKGROUND

Recently, a high-speed non-volatile memory referred to as a storage class memory has been developed. In addition to being data-rewritable in a page unit, the storage class memory is data-writable in a unit smaller than the page unit, such as a byte unit, for example. A non-volatile memory that has become data-writable in a byte unit in this manner becomes directly-accessible from a central processing unit (CPU).

In addition, a conventional file system maps data included in a file stored in a storage into an address space in a virtual memory device obtained by virtualizing a Dynamic Random Access Memory (DRAM) or the like. It thereby becomes possible for the CPU to efficiently access the data included in the file.

Meanwhile, the conventional file system handles a file stored in a non-volatile memory referred to as a storage class memory, similarly to a file stored in the storage. Thus, when a CPU to which the conventional file system is applied accesses data included in a file stored in the storage class memory, the CPU once maps the file into a virtual memory device, and then, accesses the data.

Therefore, it is difficult for the conventional file system to efficiently access a file stored in the storage class memory.

DETAILED DESCRIPTION

According to an embodiment, an information processing apparatus includes a first memory, a non-volatile memory, and one or more processors. The one or more processors are configured to execute information processing on data stored in the first memory and the non-volatile memory.

The one or more processors allocate, to each of pages included in a file stored in the non-volatile memory by executing an operating system, a memory access method that indicates either copy access processing or direct access processing to be executed. The copy access processing performs writing and readout of data copied from the non-volatile memory into the first memory. The direct access processing directly performs writing and readout of data stored in the non-volatile memory. The one or more processors access the non-volatile memory or the first memory by the memory access method allocated to each of the pages included in the file when the operating system receives a request from an application program for writing or readout on the file.

Hereinafter, an information processing apparatus 10 according to an embodiment will be described in detail with reference to the drawings. In addition, while a plurality of embodiments will be described below, blocks having substantially the same functions and configurations are assigned the same signs, and the description of redundant content will be omitted in second and subsequent embodiments.

First Embodiment

Figure 1:
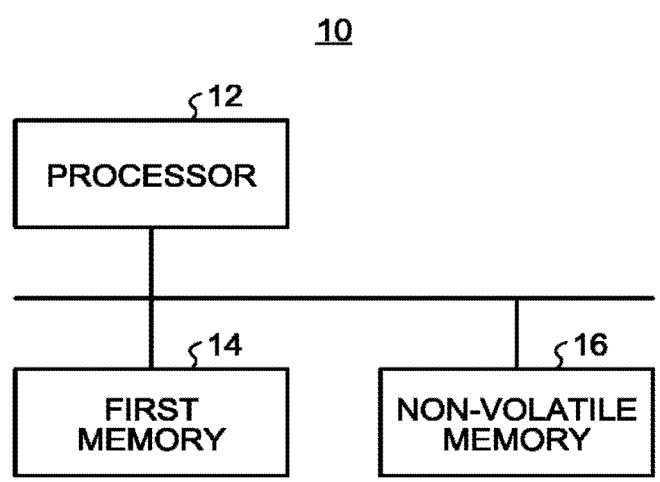
FIG. 1 is a diagram illustrating a hardware configuration of an information processing apparatus according to a first embodiment.

FIG. 1 is a diagram illustrating a hardware configuration of an information processing apparatus 10 according to the first embodiment. The information processing apparatus 10 according to the first embodiment includes a processor 12, a first memory 14, and a non-volatile memory 16.

The processor 12 is, for example, a CPU. The processor 12 may include one or more CPU cores. The processor 12 processes data by executing a program. In accordance with the execution of the program, the processor 12 reads out data from the first memory 14 or the non-volatile memory 16, or writes data into the first memory 14 or the non-volatile memory 16.

The first memory 14 is a main memory device (main memory) used as a work area by the processor 12. The first memory 14 is a volatile memory from which stored data is cleared when, for example, power supply is stopped. The first memory 14 is a DRAM, for example. In addition, the first memory 14 may be a non-volatile memory such as a Magnetoresistive Random Access Memory (MRAM), to which high-speed access can be performed similarly to the DRAM.

In addition, the first memory 14 has a larger number of writable times than that of the non-volatile memory 16. For example, the first memory 14 has such a large write endurance that design needs not be made considering the number of writable time (e.g. that design can be made assuming that there is no limit on the number of writable times).

The non-volatile memory 16 is a memory that continues to store data even if power supply is stopped. Data stored in the non-volatile memory 16 is managed by a file system. The file system manages data stored in the non-volatile memory 16, in a unit referred to as a file. A file system is set in the non-volatile memory 16, and management information or the like that corresponds to the set file system is written thereinto.

The non-volatile memory 16 includes a large-capacity high-speed non-volatile memory having a larger capacity than the DRAM, for example. The non-volatile memory 16 is a MRAM, a phase change memory (PCM), a phase random access memory (PRAM), a phase change random access memory (PCRAM), a resistance change random access memory (ReRAM), a ferroelectric random access memory (FeRAM), a 3DXPoint, a Memristor, or the like, for example. The non-volatile memory 16 may be a memory referred to as a so-called storage class memory (SCM). In addition, the non-volatile memory 16 may be a module in which a plurality of semiconductor devices are provided on one substrate, casing, or the like.

The non-volatile memory 16 has a larger capacity as compared with the first memory 14. The capacity of the non-volatile memory 16 may be the same as that of the first memory 14. In addition, the non-volatile memory 16 has an access speed equivalent to or a bit slower than an access speed of the first memory 14. In addition, the non-volatile memory 16 has zero standby power or extremely-little standby power as compared with the first memory 14.

As an example, the non-volatile memory 16 is a memory having an access latency of about 10 nanoseconds to several microseconds.

The non-volatile memory 16 is data-writable and data-readable in a unit of a small region such as a byte unit. Thus, the processor 12 can directly access the non-volatile memory 16 by a readout command or a writing command. The processor 12 can directly access the non-volatile memory 16 in a cache line unit or the like, for example.

Figure 2:
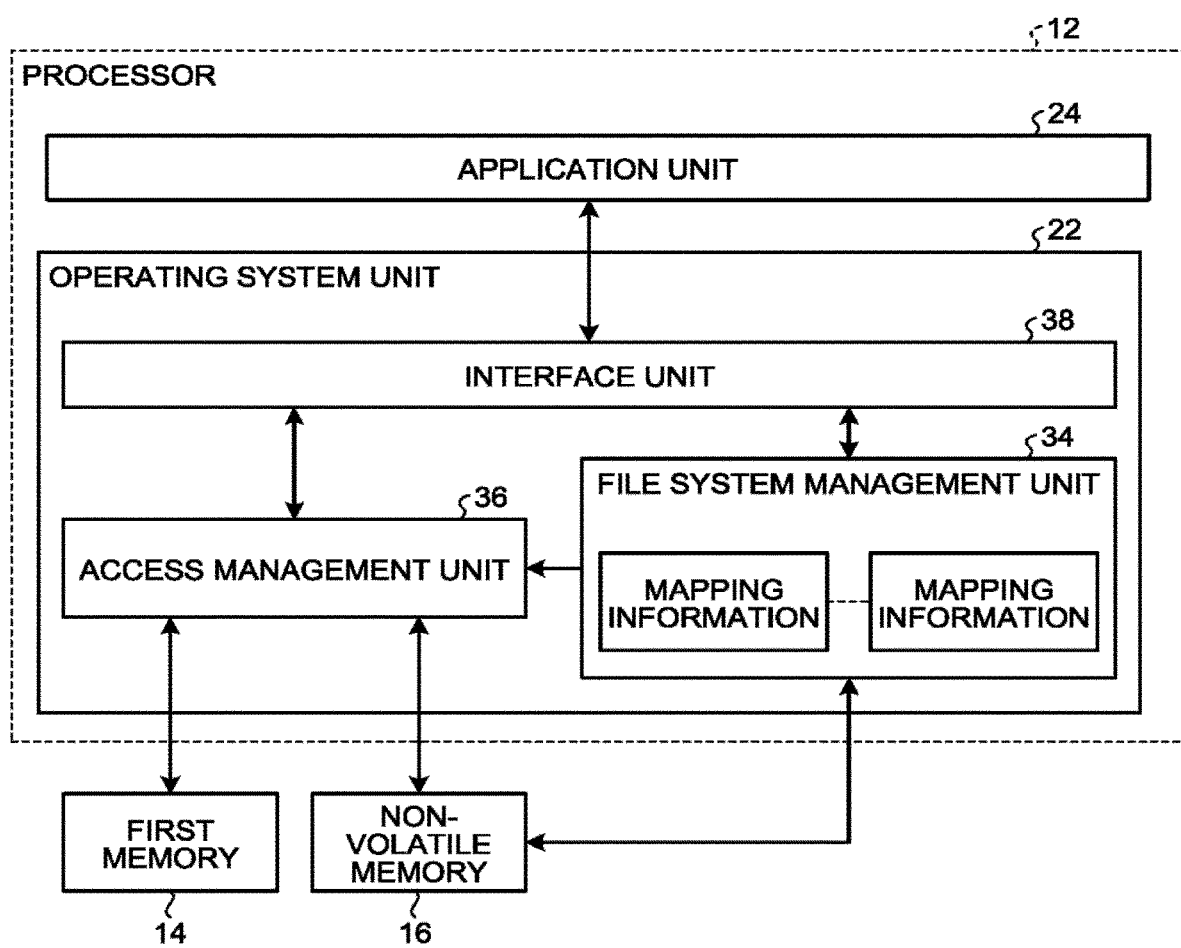
FIG. 2 is a diagram illustrating a functional configuration of a processor together with a first memory and a non-volatile memory.

FIG. 2 is a diagram illustrating a functional configuration of the processor 12 together with the first memory 14 and the non-volatile memory 16. The processor 12 includes an operating system unit 22 and an application unit 24.

The operating system unit 22 is a functional block implemented by the processor 12 executing an operating system. The operating system is a basic program for operating the information processing apparatus 10. The operating system unit 22 executes operation control of the entire information processing apparatus 10, control of access with respect to the first memory 14 and the non-volatile memory 16, control of a device connected to the information processing apparatus 10, user interface, and the like.

The application unit 24 is a functional block implemented by the processor 12 executing an application program. The application unit 24 operates under the management of the operating system unit 22. The processor 12 may concurrently execute a plurality of application programs. In this case, the processor 12 includes a plurality of application units 24.

The operating system unit 22 includes a file system management unit 34, an access management unit 36, and an interface unit 38.

The file system management unit 34 manages data stored in the non-volatile memory 16, in a unit of a file, based on a file system. In addition, the file system management unit 34 manages a file by a unit of a page being a management unit of data of a virtual memory device. A size of a page varies for each architecture, and is 4K bytes, for example. In addition, the file system management unit 34 allocates a virtual address indicating a storage position in a virtual memory device, to each of a plurality of pages included in a file accessed by the application unit 24. The file system management unit 34 manages, for each file, mapping information that links to each other a virtual address of each page and a memory address indicating a storage position in the first memory 14 or the non-volatile memory 16.

In accordance with an access request with respect to a file from the application unit 24, the access management unit 36 accesses the first memory 14 or the non-volatile memory 16. For example, in accordance with a writing command, the access management unit 36 writes data in a designated page included in a file, into the first memory 14 or the non-volatile memory 16. In addition, for example, in accordance with a readout command, the access management unit 36 reads out data in a designated page included in a file, from the first memory 14 or the non-volatile memory 16.

The interface unit 38 provides the application unit 24 with an Application Programming Interface (API) for performing manipulation on files. As an example, the interface unit 38 provides an open system call, a read system call, a write system call, a map system call, and the like.

The open system call is a system call of file open that declares a start of access to a file. The read system call is a system call representing a readout request for reading out designated data. The write system call is a system call representing a writing request for writing designated data. The map system call is a system call of memory mapping for mapping data in a file into a virtual memory device.

When the interface unit 38 receives a system call from the application unit 24, the interface unit 38 causes the file system management unit 34, the access management unit 36, or the like to execute corresponding processing. Then, the interface unit 38 returns a return value indicating an execution result or the like, to the application unit 24.

Figure 3:
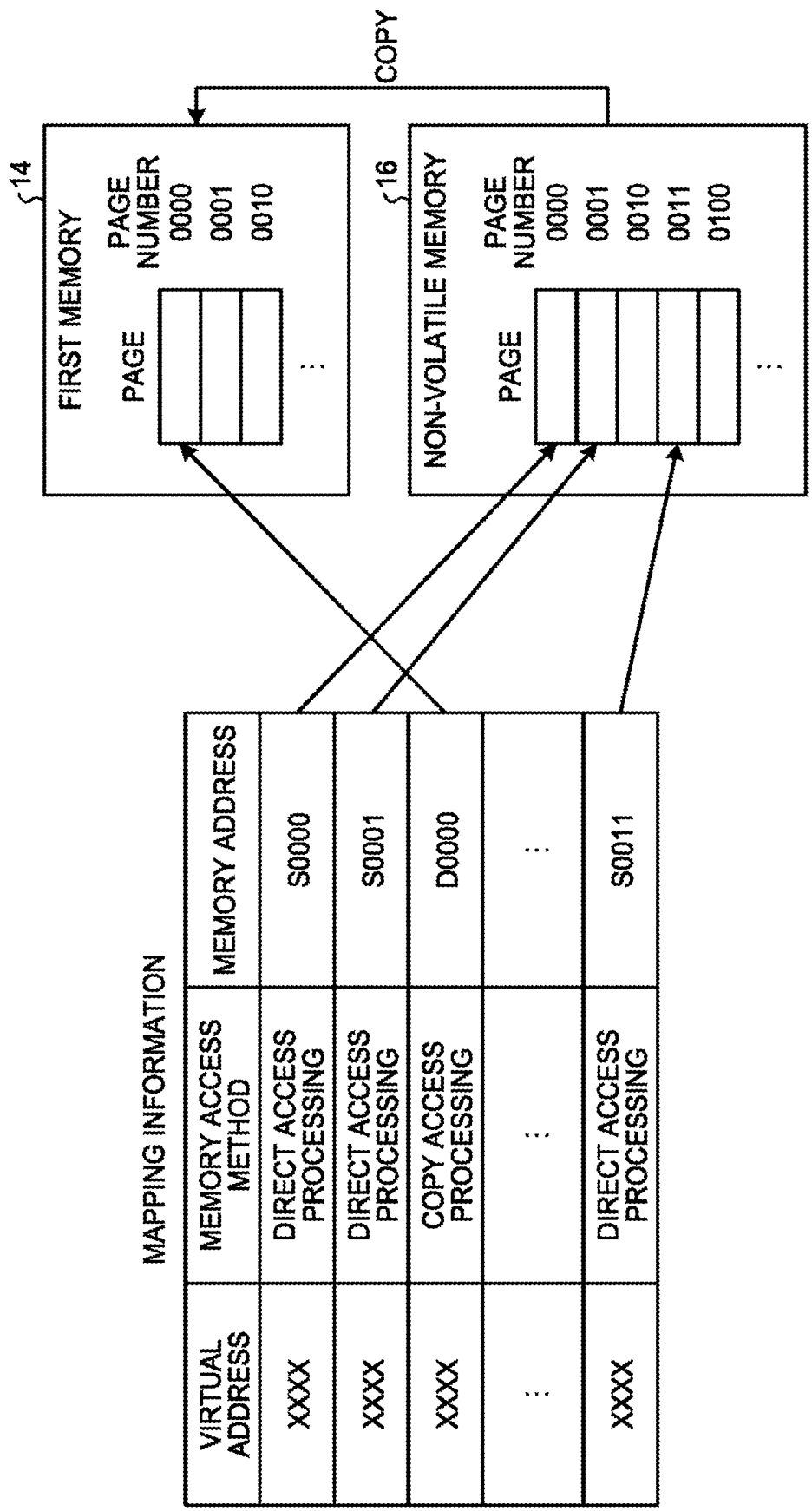
FIG. 3 is a diagram illustrating an example of mapping information.

FIG. 3 is a diagram illustrating an example of mapping information. The file system management unit 34 allocates a continuous address space in a virtual memory device to a file accessed by the application unit 24. Then, the file system management unit 34 allocates a virtual address indicating a storage position in a virtual memory device, to each of a plurality of pages included in a file. It thereby becomes possible for the access management unit 36 to easily access data in a designated page included in a file.

Furthermore, the file system management unit 34 allocates, to each of a plurality of pages included in a file stored in the non-volatile memory 16, a memory access method indicating which of copy access processing and direct access processing is to be executed.

The copy access processing is a method of performing writing and readout with respect to data copied from the non-volatile memory 16 to the first memory 14. The direct access processing is a method of directly performing writing and readout with respect to data stored in the non-volatile memory 16.

The file system management unit 34 may allocate, based on information acquired from the application unit 24, for example, to each of a plurality of pages included in a file, whether the copy access processing is to be executed or the direct access processing is to be executed. In addition, the file system management unit 34 may allocate, based on information pre-registered in file system information stored in the non-volatile memory 16, for example, to each of a plurality of pages included in a file, whether the copy access processing is to be executed or the direct access processing is to be executed.

In accordance with the allocation of memory access methods to a plurality of pages, the file system management unit 34 generates mapping information for each file. The mapping information links, to each other for each of pages included in a corresponding file, a virtual address, a memory address indicating a storage position in the first memory 14 or the non-volatile memory 16, and a memory access method.

Figure 4:
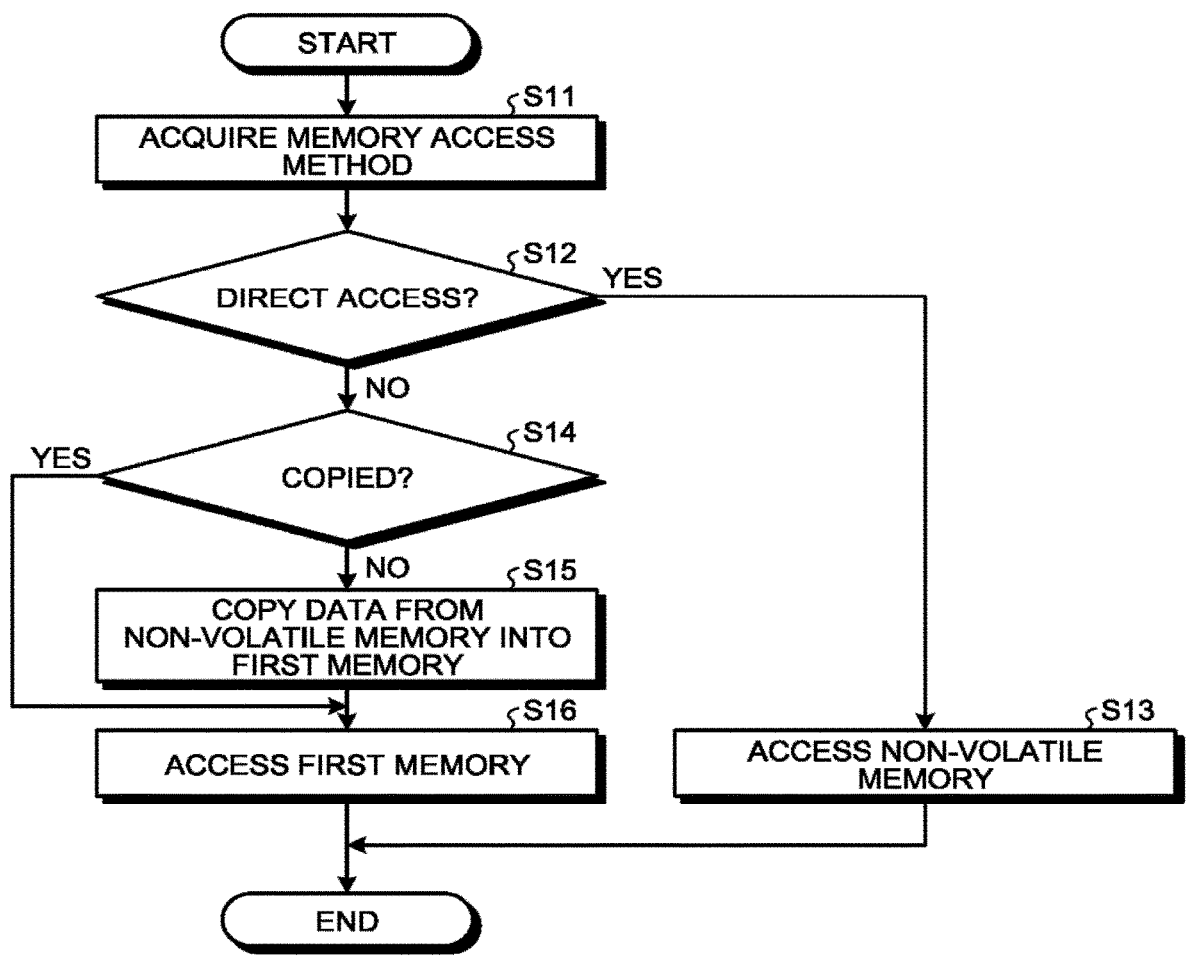
FIG. 4 is a flowchart illustrating a flow of processing of an access management unit.

FIG. 4 is a flowchart illustrating a flow of processing of the access management unit 36. When the access management unit 36 receives an access request (writing request or readout request) with respect to a designated page included in a file, from the application unit 24, the access management unit 36 executes the processing in a flow illustrated in FIG. 4.

In S11, the access management unit 36 refers to the mapping information, and acquires a memory access method in an access target page. Subsequently, in S12, the access management unit 36 determines whether or not the acquired memory access method is direct access processing. When the memory access method is direct access processing (Yes in S12), the access management unit 36 advances the processing to S13. Then, in S13, the access management unit 36 accesses a memory address in the non-volatile memory 16 that is indicated in the mapping information. When ending S13, the access management unit 36 ends access processing for the page.

On the other hand, when the memory access method is not direct access processing (No in S12), that is, when the memory access method is copy access processing, the access management unit 36 advances the processing to S14. In S14, the access management unit 36 determines whether data in the page stored into the non-volatile memory 16 has been already copied into the first memory 14. When the data has already been copied (Yes in S14), the access management unit 36 advances the processing to S16.

When the data has not been copied yet (No in S14), the access management unit 36 advances the processing to S15. In S15, the access management unit 36 copies the data in the page from the non-volatile memory 16 into the first memory 14. Furthermore, the access management unit 36 rewrites a corresponding memory address indicated in the mapping information, from an address on the non-volatile memory 16, to an address on the first memory 14. When ending S15, the access management unit 36 advances the processing to S16.

In S16, the access management unit 36 accesses the memory address in the first memory 14 that is indicated in the mapping information. When ending S16, the access management unit 36 ends access processing for the page.

As described above, when an operating system receives an access request from an application program (a request for writing or readout) on a file, the access management unit 36 accesses, for each of a plurality of pages included in the file, the first memory 14 and the non-volatile memory 16 by an allocated memory access method. More specifically, when the copy access processing is allocated as a memory access method of a page for which an access request has been issued, the access management unit 36 executes the copy access processing of performing writing and readout with respect to data copied from the non-volatile memory 16 into the first memory 14. On the other hand, when the direct access is allocated as a memory access method of a page for which an access request has been issued, the access management unit 36 executes the direct access processing of directly performing writing and readout with respect to data stored in the non-volatile memory 16.

In this manner, the access management unit 36 accesses the non-volatile memory 16 by two types of access methods. For example, when an application having high locality is executed for memory access, the access management unit 36 accesses a page stored in the non-volatile memory 16, by the copy access processing. The access management unit 36 can thereby perform processing on the same page at higher speed when an application having high locality is executed for memory access.

In addition, for example, when processing with low locality is executed for memory access as in random access, the access management unit 36 accesses a page stored in the non-volatile memory 16, by the direct access processing. The access management unit 36 can thereby eliminate an overhead of transfer processing from the non-volatile memory 16 to the first memory 14, and can efficiently perform processing, when processing with low locality is executed. In this manner, the access management unit 36 can efficiently perform processing by using two types of access methods including the copy access processing and the direct access processing.

Figure 5:
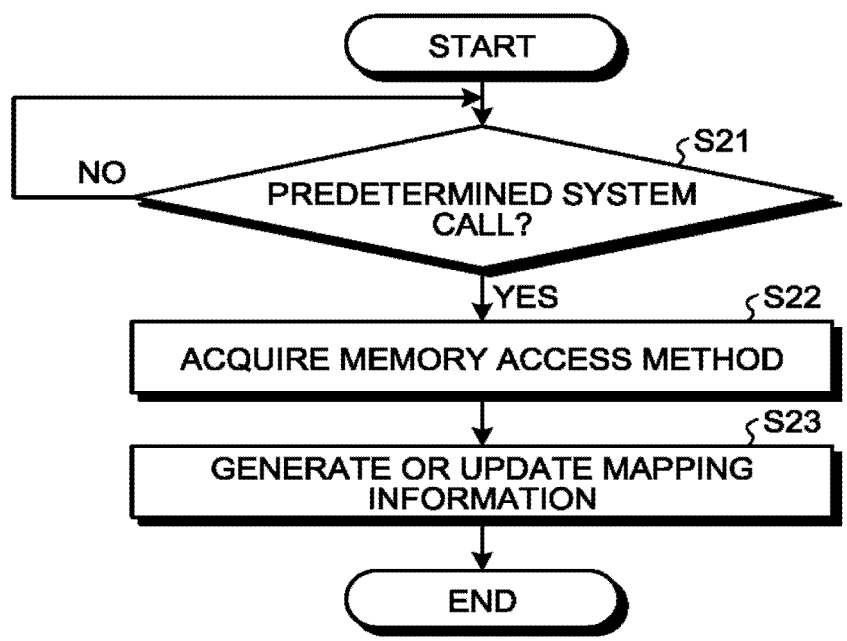
FIG. 5 is a diagram illustrating a flow of processing of a file system management unit of the first embodiment.

FIG. 5 is a flowchart illustrating a flow of processing of the file system management unit 34 that is performed when mapping information is generated or updated in the first embodiment. The file system management unit 34 generates or updates mapping information by executing the processing illustrated in FIG. 5, for example.

In S21, the file system management unit 34 determines whether a predetermined system call has been acquired from the application unit 24. When the predetermined system call has been acquired (Yes in S21), the file system management unit 34 advances the processing to S22, and when the predetermined system call has not been acquired (No in S21), causes the processing to stand by in S21. The predetermined system call is the open system call or the map system call, for example.

In S22, the file system management unit 34 acquires, from the application unit 24, information indicating a memory access method of each of a plurality of pages included in the file. Subsequently, in S23, the file system management unit 34 generates or updates mapping information for the information acquired from the application unit 24. For example, when mapping information has not been generated yet, the file system management unit 34 newly generates mapping information. In addition, when mapping information has been already generated, the file system management unit 34 updates the mapping information using the information acquired from the application unit 24. When the processing in S23 ends, the file system management unit 34 ends this flow.

In this manner, when an operating system receives a predetermined system call from an application program, the file system management unit 34 generates or updates mapping information based on information acquired from the application program. For example, when an operating system receives a system call of file open from an application program, the file system management unit 34 generates mapping information based on information acquired from the application program. In addition, for example, when an operating system receives a system call of memory mapping from an application program, the file system management unit 34 generates or updates mapping information based on information acquired from the application program. The file system management unit 34 can thereby allocate a memory access method of each page according to an instruction of a creator or a user of an application program.

As described above, the information processing apparatus 10 according to the present embodiment can set the copy access processing or the direct access processing for each of a plurality of pages included in a file. With this configuration, according to the information processing apparatus 10 according to the present embodiment, it is possible to efficiently access data included in a file stored in the non-volatile memory 16.

Second Embodiment

Figure 6:
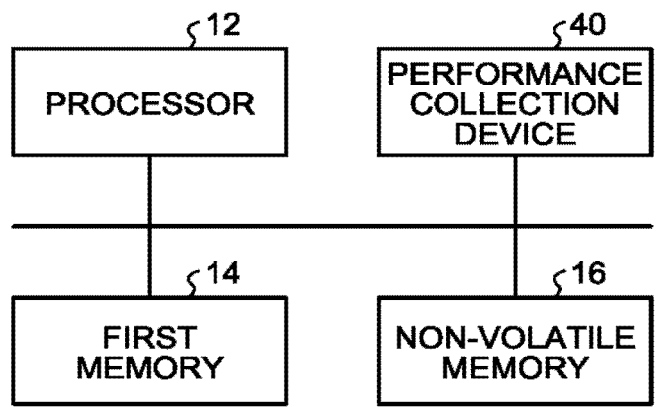
FIG. 6 is a diagram illustrating a hardware configuration of an information processing apparatus according to a second embodiment.

FIG. 6 is a diagram illustrating a hardware configuration of an information processing apparatus 10 according to the second embodiment. The information processing apparatus 10 according to the second embodiment includes a processor 12, a first memory 14, a non-volatile memory 16, and a performance collection device 40.

The performance collection device 40 detects operation information of the processor 12. The performance collection device 40 may be a device referred to as a performance counter.

The performance collection device 40 analyzes operation on the first memory 14 and the non-volatile memory 16 in the processor 12 and acquires operation information every constant time. The operation information may be the number of writings performed by the processor 12 with respect to a main memory device, the number of readouts performed by the processor 12 with respect to the main memory device, a prefetch success rate of the processor 12, the number of cache hits of the processor 12, the number of cache mistakes of the processor 12, the number of TLB mistakes, or the like. The operation information is not limited to these ones. The operation information may be the number of predetermined events in the processor 12, the number of retired commands, the number of core clocks, the number of cache hits/the number of cache mistakes of each hierarchy (L1 cache, L2 cache, L3 cache, and last-level cache) in a cache memory, the number of cache lines expelled from the last-level cache, the number of cycles stalled by a cache of each hierarchy in cache mistakes, or the like.

The file system management unit 34 acquires an analysis result obtained by the performance collection device 40, at a predetermined timing. In dependence on the acquired analysis result, the file system management unit 34 decides a memory access method for each of a plurality of pages included in a file, and updates mapping information in accordance with the memory access method decided for each of the plurality of pages.

In the second embodiment, the performance collection device 40 is implemented by a device separate from the processor 12. Alternatively, the performance collection device 40 may be implemented as a part of functions of an operating system executed by the processor 12, or a function executed by an application program. In addition, the performance collection device 40 may be incorporated into the processor 12 as a part of functions of the processor 12.

Figure 7:
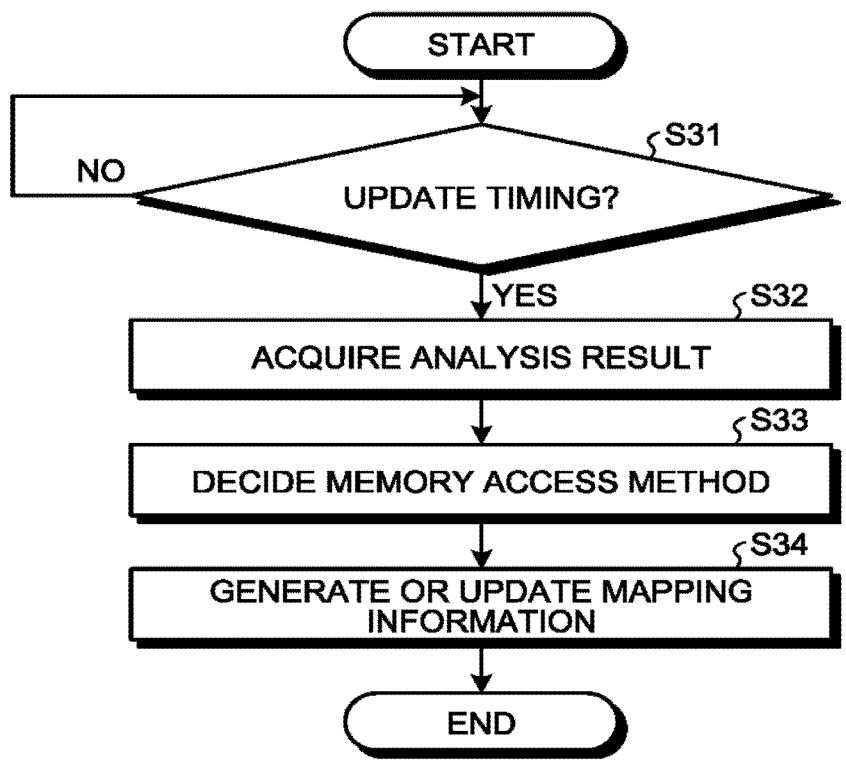
FIG. 7 is a diagram illustrating a flow of processing of a file system management unit of the second embodiment.

FIG. 7 is a flowchart illustrating a flow of processing of the file system management unit 34 that is performed when mapping information is generated in the second embodiment. The file system management unit 34 generates or updates mapping information by executing the processing illustrated in FIG. 7, for example.

In S31, the file system management unit 34 determines whether a predetermined update timing has come. For example, the file system management unit 34 determines that the predetermined update timing has come, after a certain period of time elapses from when a file is opened, or every certain period of time. When the file system management unit 34 determines that the predetermined update timing has come (Yes in S31), the file system management unit 34 advances the processing to S32, and when the predetermined update timing has not come (No in S31), causes the processing to stand by in S31.

In S32, the file system management unit 34 acquires an analysis result from the performance collection device 40. Subsequently, in S33, the file system management unit 34 decides a memory access method for each of a plurality of pages included in a file depending on the analysis result. For example, the file system management unit 34 acquires, for each of the plurality of pages, the number of writings with respect to the non-volatile memory 16 within a predetermined period. Then, when the number of writings is larger than a preset first threshold value, the file system management unit 34 decides on the copy access processing. When the number of writings is equal to or smaller than the first threshold value, the file system management unit 34 decides on the direct access processing.

Subsequently, in S34, the file system management unit 34 updates mapping information in accordance with the memory access method decided for each of the plurality of pages. When the processing in S34 ends, the file system management unit 34 ends this flow.

In this manner, the file system management unit 34 updates mapping information based on an analysis result obtained by the performance collection device 40. The file system management unit 34 can thereby decide a memory access method so as to efficiently access a file in accordance with an operation situation of the current time.

In the specification of the non-volatile memory 16, an upper limit is set on the number of writings. Thus, in the non-volatile memory 16, when a large amount of writings occur in the same page in a short time, the number of writings of the page reaches an upper limit in a short period and an operation life is exhausted although the numbers of writings of other pages are small. The file system management unit 34 can decide on the copy access processing for a page in which a large amount of writings occur in a short time (page on which local writings occur), and decide on the direct access processing for a page in which local writings do not occur. The file system management unit 34 can thereby averagely perform writing with respect to all of the plurality of pages.

As described above, the information processing apparatus 10 according to the present embodiment can set the copy access processing or the direct access processing for each of a plurality of pages included in a file depending on an analysis result obtained from the performance collection device 40. With this configuration, according to the information processing apparatus 10 according to the present embodiment, it is possible to efficiently access data included in a file stored in the non-volatile memory 16, and prolong an operation life of the non-volatile memory 16.

Third Embodiment

Figure 8:
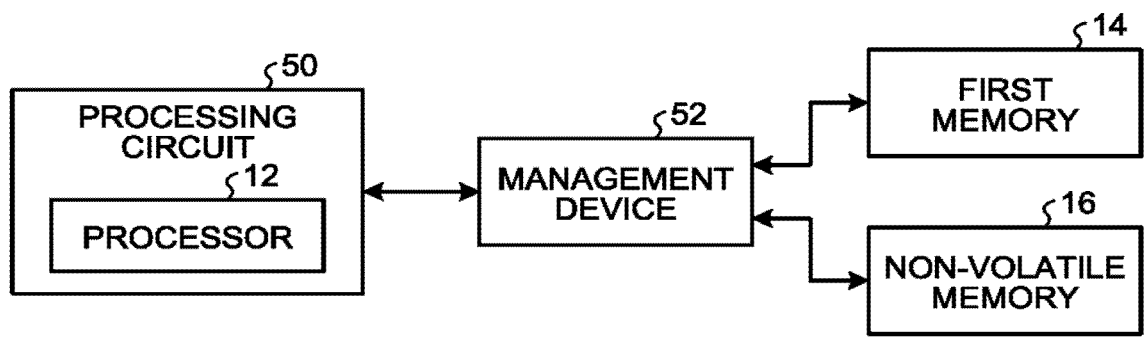
FIG. 8 is a diagram illustrating a hardware configuration of an information processing apparatus according to a third embodiment.

FIG. 8 is a diagram illustrating a hardware configuration of an information processing apparatus 10 according to the third embodiment. The information processing apparatus 10 according to the third embodiment includes a processing circuit 50, a first memory 14, a non-volatile memory 16, and a management device 52.

The processing circuit 50 includes the processor 12. In accordance with the execution of the program performed by the processor 12, the processing circuit 50 reads out data from the first memory 14 or the non-volatile memory 16, or writes data into the first memory 14 or the non-volatile memory 16, via the management device 52.

The management device 52 controls readout and writing of data on the first memory 14 and the non-volatile memory 16, each being performed by the processing circuit 50. The management device 52 receives an access request with respect to the first memory 14 and the non-volatile memory 16 from the processing circuit 50, and executes processing corresponding to the access request. More specifically, in response to a writing command from the processing circuit 50, the management device 52 writes data into the first memory 14 or the non-volatile memory 16. In addition, in response to a readout command from the processing circuit 50, the management device 52 reads out data from the first memory 14 or the non-volatile memory 16, and grants the read-out data to the processing circuit 50.

In addition, the management device 52 executes wear leveling control on the non-volatile memory 16. More specifically, the management device 52 manages the number of data rewritings for each area in the non-volatile memory 16. Then, based on the number of rewritings of each area, the management device 52 controls a data writing position so that data is averagely written in throughout the entire area in the non-volatile memory 16.

In addition, the management device 52 may be a memory controller formed by hardware separate from the processing circuit 50, for example. In addition, the management device 52 may be a part of pieces of hardware of the processing circuit 50 (e.g. circuit formed on the same semiconductor substrate as the processing circuit 50), or may be implemented by a combination of a part of pieces of hardware of the processing circuit 50 and a memory controller.

In addition, for example, the management device 52 may be a memory management unit (MMU) formed by hardware separate from the processing circuit 50. In addition, the management device 52 may be implemented by a combination of a part of pieces of hardware of the processing circuit 50, and a memory management unit.

In addition, the management device 52 may be implemented by a combination of a memory controller and a memory management unit (MMU). In addition, the management device 52 may be implemented by a combination of a part of pieces of hardware of the processing circuit 50, a memory controller, and a memory management unit.

Figure 9:
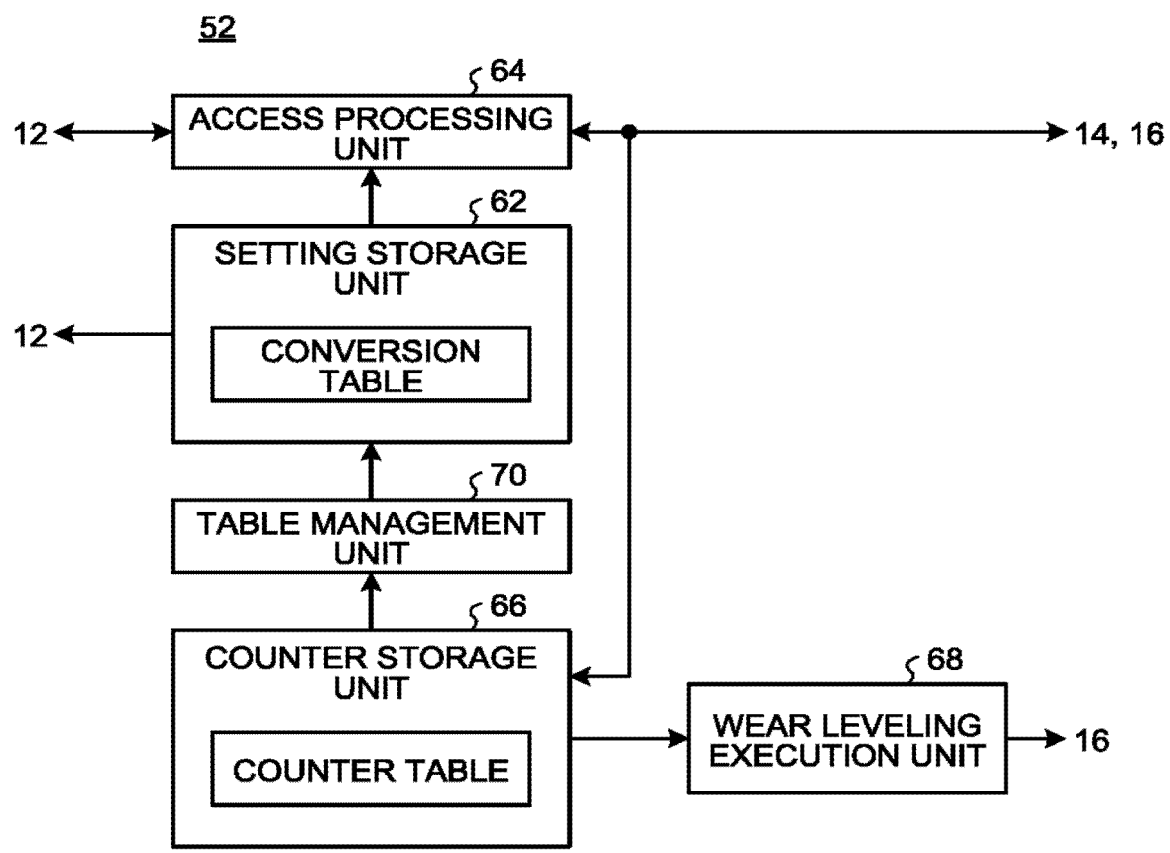
FIG. 9 is a diagram illustrating a configuration of a management device.

FIG. 9 is a diagram illustrating a configuration of the management device 52. The management device 52 includes a setting storage unit 62, an access processing unit 64, a counter storage unit 66, a wear leveling execution unit 68, and a table management unit 70.

The setting storage unit 62 stores a conversion table. The conversion table is information including, for each page for which the processing circuit 50 issues an access request, a correspondence relationship between a request address and a corresponding page number (physical address) in the first memory 14 or the non-volatile memory 16.

The conversion table further includes, for each page for which the processing circuit 50 issues an access request, an access method indicating which of first access processing and second access processing is to be executed.

The first access processing is a method of performing writing and readout with respect to data transferred from the non-volatile memory 16 to the first memory 14. The second access processing is a method of directly performing writing and readout with respect to data stored in the non-volatile memory 16. In addition, the details of the conversion table will be described later with reference to FIG. 10.

The access processing unit 64 processes an access request with respect to the first memory 14 and the non-volatile memory 16 from the processor 12 of the processing circuit 50. More specifically, in response to a writing command from the processor 12, the access processing unit 64 writes data into the first memory 14 or the non-volatile memory 16. In addition, in response to a readout command from the processor 12, the access processing unit 64 reads out data from the first memory 14 or the non-volatile memory 16, and grants the read-out data to the processing circuit 50.

In addition, for a page for which the processor 12 has issued an access request, the access processing unit 64 accesses the first memory 14 or the non-volatile memory 16 by an access method stored in the conversion table. In other words, when a writing or readout request is received for a page set to the first access processing, the access processing unit 64 executes the first access processing. In addition, when a writing or readout request is received for a page set to the second access processing, the access processing unit 64 executes the second access processing. In addition, the details of the access method will be described later with reference to FIGS. 10 and 11.

The counter storage unit 66 stores a counter table. The counter table stores, for each of a plurality of storage regions (page regions) included in the non-volatile memory 16, a counter value representing the number of writings of data.

The wear leveling execution unit 68 executes wear leveling control on the non-volatile memory 16 based on a counter value of each page region that is stored in the counter storage unit 66. The wear leveling execution unit 68 controls the arrangement of data stored in the non-volatile memory 16, in such a manner that data are averagely written into the entire region in the non-volatile memory 16.

The table management unit 70 performs change processing of an access method stored in the conversion table. For example, when a writing amount with respect to the non-volatile memory 16 is larger than a setting value, for example, the table management unit 70 selects any replacement target page set to the second access processing, among a plurality of pages managed by the conversion table. Then, the table management unit 70 changes an access method of the selected replacement target page from the second access processing to the first access processing.

Figure 10:
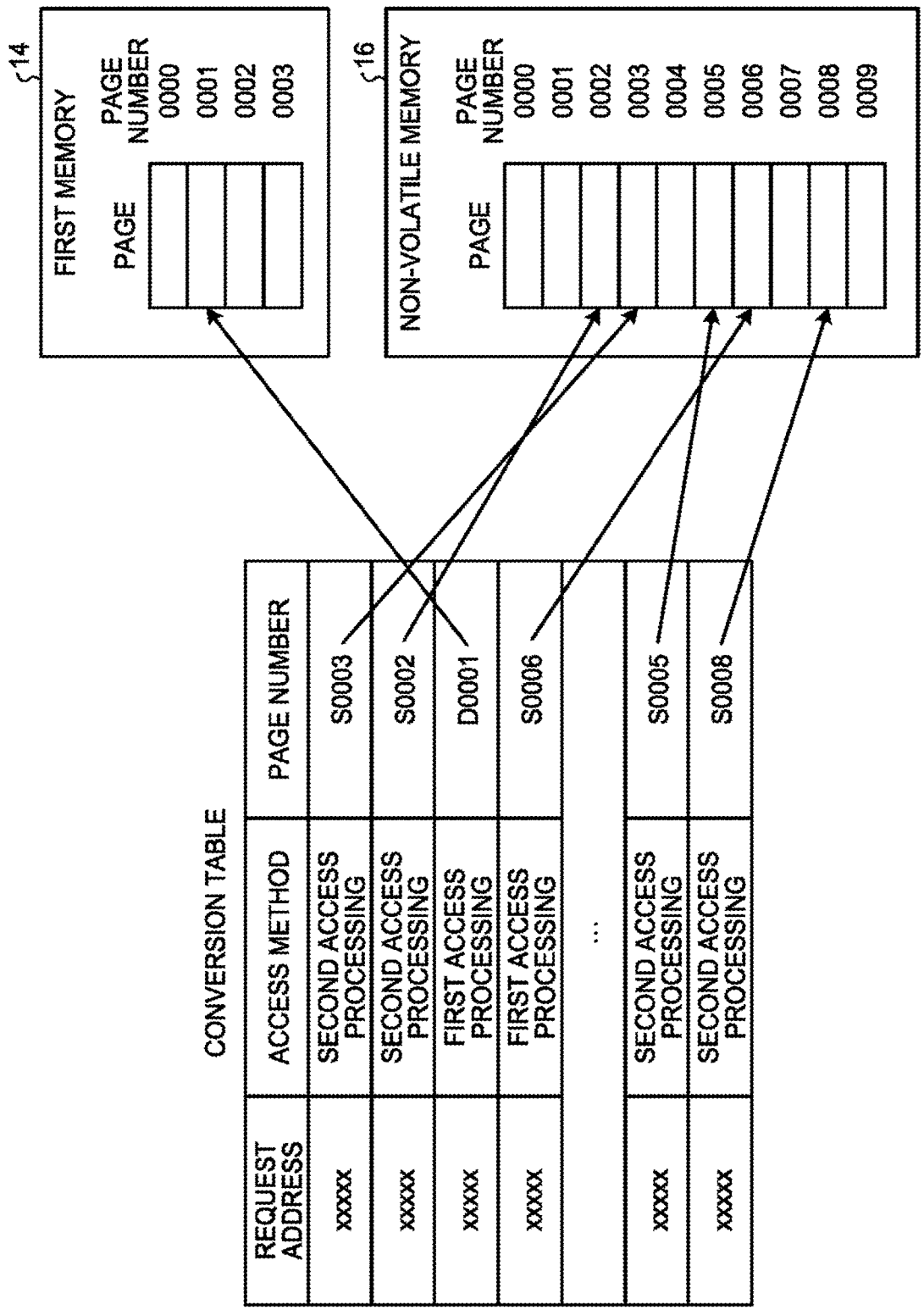
FIG. 10 is a diagram illustrating an example of a conversion table.

FIG. 10 is a diagram illustrating an example of the conversion table. The conversion table stores, for each page for which the processing circuit 50 issues an access request, a correspondence relationship between a request address and a corresponding page number (physical address) in the first memory 14 or the non-volatile memory 16. In other words, the conversion table stores mapping information indicating in which page in the first memory 14 or the non-volatile memory 16 data corresponding to the request address issued by the processing circuit 50 is stored.

For example, in the example in FIG. 10, a page for which "Sxxxx" is described in the column of a page number in the conversion table indicates a page having a page number "xxxx" in the non-volatile memory 16. For example, in the example in FIG. 10, a page for which "Dxxxx" is described in the column of a page number indicates a page having a page number "xxxx" in the first memory 14. In addition, x here indicates an arbitrary value.

Furthermore, the conversion table stores, for each page for which the processing circuit 50 issues an access request, an access method indicating which of first access processing and second access processing is to be executed. In addition, the configuration of the conversion table is not limited to the configuration as illustrated in FIG. 10, and the conversion table may have another configuration.

Figure 11:
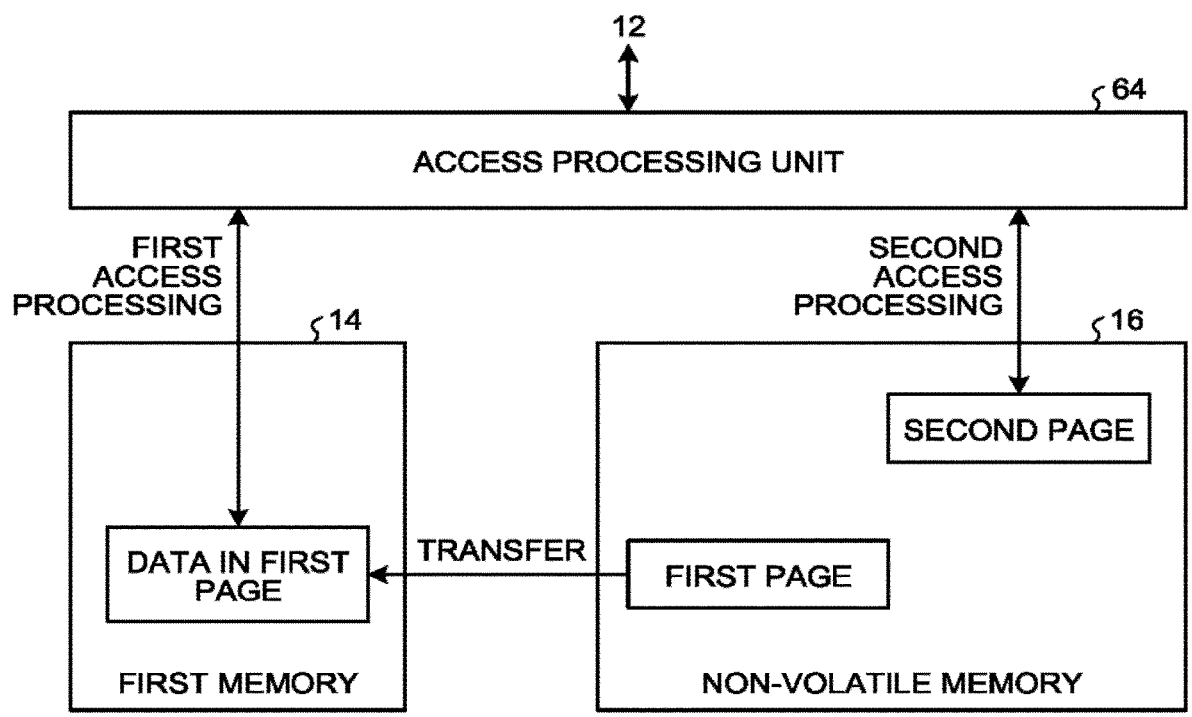
FIG. 11 is a diagram illustrating the details of first access processing and second access processing.

FIG. 11 is a diagram illustrating the details of the first access processing and the second access processing. When a writing or readout request is received for a first page set to the first access processing, the access processing unit 64 executes the first access processing on the non-volatile memory 16.

For example, as illustrated in FIG. 11, in the first access processing, the access processing unit 64 transfers data in the first page that is stored in the non-volatile memory 16, and stores the data into the first memory 14. The first memory 14 can thereby store a copy of the data in the first page that is stored in the non-volatile memory 16. Subsequently, in the first access processing, the access processing unit 64 performs readout and writing with respect to the data in the first page that has been transferred from the non-volatile memory 16 and is stored in the first memory 14. For example, the access processing unit 64 performs readout and writing of data with respect to the data in the first page that has been transferred from the non-volatile memory 16 to the first memory 14, in a size smaller than a page region (e.g. cache line size of the processor 12). Then, in the first access processing, in cases such as a case where a free space of the first memory 14 becomes insufficient, and it becomes impossible to transfer data from the non-volatile memory 16 to the first memory 14, and a case where it is determined that storage in the first memory 14 is unnecessary, the access processing unit 64 writes back the data in the first page that has been transferred to the first memory 14, to the non-volatile memory 16.

In addition, the access processing unit 64 may write back the data in the first page that has been transferred to the first memory 14, to an original region or to another region. For example, in the first access processing, the access processing unit 64 may write back the data in the first page that has been transferred from the non-volatile memory 16 to the first memory 14, to an unused region not associated with any request address. The access processing unit 64 can thereby reduce a gap between the numbers of rewritings among page regions, and suppress quality deterioration of a specific page region.

In addition, when a writing or readout request is received for a second page set to the second access processing, the access processing unit 64 executes the second access processing on the non-volatile memory 16.

For example, as illustrated in FIG. 11, in the second access processing, the access processing unit 64 directly performs readout and writing with respect to data in the second page in the non-volatile memory 16. For example, the access processing unit 64 performs readout and writing of data in a size smaller than a page region.

In this manner, the access processing unit 64 accesses the non-volatile memory 16 by two types of access methods. For example, when an application having high locality is executed for memory access, the access processing unit 64 accesses a page by the first access processing. The access processing unit 64 can thereby perform processing at higher speed when an application having high locality is executed for memory access.

In addition, for example, when processing with low locality is executed for memory access as in random access, the access processing unit 64 accesses a page by the second access processing. The access processing unit 64 can thereby eliminate an overhead of transfer processing from the non-volatile memory 16 to the first memory 14, and can efficiently perform processing, when processing with low locality is executed. In this manner, the access processing unit 64 can efficiently perform processing by using two types of access methods including the first access processing and the second access processing.

Figure 12:
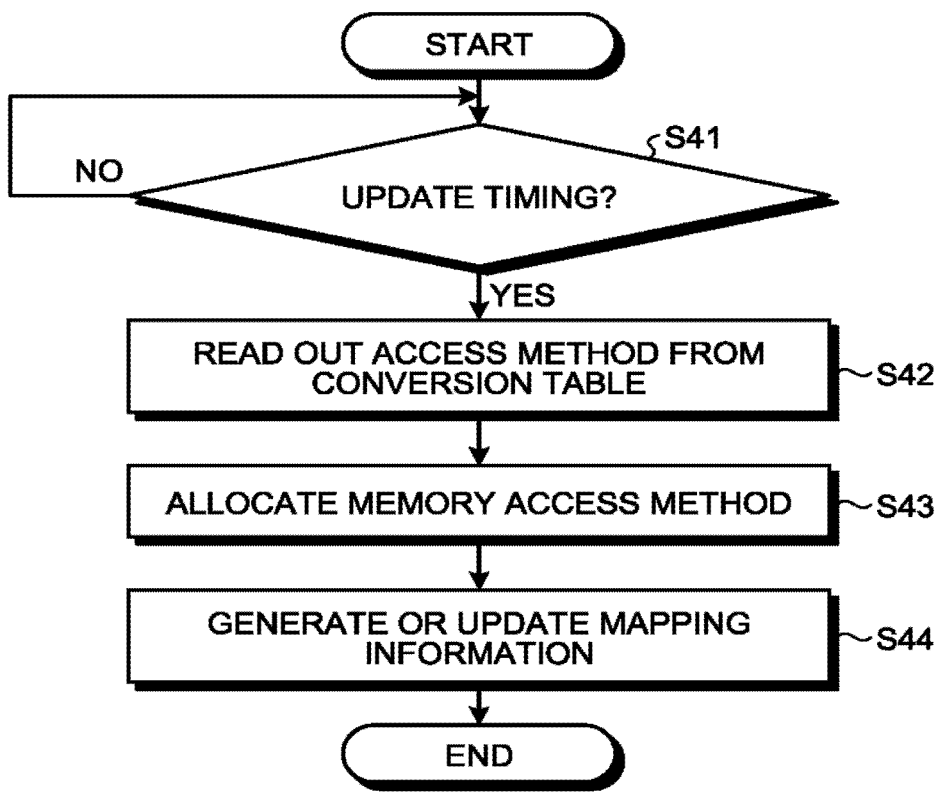
FIG. 12 is a diagram illustrating a flow of processing of a file system management unit of the third embodiment.

FIG. 12 is a flowchart illustrating a flow of processing of the file system management unit 34 that is performed when mapping information is updated in the third embodiment. In the third embodiment, the file system management unit 34 generates or updates mapping information by executing the processing illustrated in FIG. 12, for example.

In S41, the file system management unit 34 determines whether a predetermined update timing has come. For example, the file system management unit 34 determines that the predetermined update timing has come, at a timing at which a file is to be opened, or at a timing at which a plurality of pages included in a file are allocated to virtual addresses in a virtual memory device. In addition, the file system management unit 34 may determine that the predetermined update timing has come, after a certain period of time elapses from when a file is opened, or every certain period of time. When the file system management unit 34 determines that the predetermined update timing has come (Yes in S41), the file system management unit 34 advances the processing to S42, and when the predetermined update timing has not come (No in S41), causes the processing to stand by in S41.

In S42, the file system management unit 34 accesses the conversion table stored in the setting storage unit 62 of the management device 52, and reads out access methods for a plurality of pages included in a target file.

Subsequently, in S43, the file system management unit 34 decides a memory access method for each of the plurality of pages included in the file, based on the read-out access methods. Specifically, the file system management unit 34 allocates the copy access processing for each of the plurality of pages included in the file, when the first access processing is set as an access method in a corresponding page in the conversion table in the setting storage unit 62. In addition, the file system management unit 34 allocates the direct access processing for each of the plurality of pages included in the file, when the second access processing is set as an access method in a corresponding page in the conversion table in the setting storage unit 62.

Subsequently, in S44, the file system management unit 34 generates or updates mapping information in accordance with a memory access method allocated to each of the plurality of pages. When the processing in S44 ends, the file system management unit 34 ends this flow.

In this manner, the file system management unit 34 allocates a memory access method to each of a plurality of pages in accordance with an access method managed by the management device 52. The file system management unit 34 can thereby access a file by a memory access method synchronized with an access method managed by the management device 52.

As described above, the information processing apparatus 10 according to the present embodiment can set the copy access processing or the direct access processing for each of a plurality of pages included in a file, in accordance with an access method managed by the management device 52. With this configuration, according to the information processing apparatus 10 according to the present embodiment, it is possible to efficiently perform access in cooperation with the management device 52, and prolong an operation life of the non-volatile memory 16.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a first memory;
a non-volatile memory;
one or more processors configured to execute information processing on data stored in the first memory and the non-volatile memory; and
a management device configured to receive an access request with respect to the first memory and the non-volatile memory from the one or more processors and access the first memory and the non-volatile memory, wherein
the one or more processors
allocate, to each of pages included in a file stored in the non-volatile memory by executing an operating system, a memory access method that indicates either copy access processing or direct access processing to be executed, the copy access processing performing writing and readout of data copied from the non-volatile memory into the first memory, the direct access processing directly performing writing and readout of data stored in the non-volatile memory, and
access the non-volatile memory or the first memory by the memory access method allocated to each of the pages included in the file when the operating system receives a request from an application program for writing or readout on the file; the management device includes,
a setting storage configured to store, for each of the pages, information including an access method that indicates either first access processing or second access processing to be executed, the first access processing performing writing and readout of data copied from the non-volatile memory into the first memory, the second access processing directly performing writing and readout of data stored in the non-volatile memory, and
an access processor configured to
execute the first access processing when a request for writing or readout is received from the one or more processors for a page that is set to the first access processing, and
execute the second access processing when a request for writing or readout is received from the one or more processors for a page that is set to the second access processing; and
the one or more processors
determine whether a predetermined update timing has come,
read out an access method in a corresponding page in the setting storage when the predetermined update timing has come, and
for each of the pages included in the file, allocate the copy access processing when the first access processing is set as the access method in the corresponding page in the setting storage, and allocate the direct access processing when the second access processing is set as the access method in the corresponding page in the setting storage.

2. The apparatus according to claim 1, wherein the one or more processors manage, for each of the pages included in the file, mapping information that links a virtual address, a memory address, and the memory access method to each other, the virtual address indicating a storage position in a virtual memory device, the memory address indicating a storage position in the first memory or the non-volatile memory.

3. The apparatus according to claim 2, wherein, when the operating system receives from the application program a system call of file open that declares a start of access to the file, the one or more processors generate the mapping information based on information acquired from the application program.

4. The apparatus according to claim 2,
wherein, when the operating system receives from the application program a system call of memory mapping for mapping data of the file into a virtual memory device, the one or more processors generate or update the mapping information based on information acquired from the application program.

5. The apparatus according to claim 2, further comprising a performance collection device configured to analyze operation on the first memory and the non-volatile memory in the one or more processors,
wherein the one or more processors decide, at a predefined timing, the memory access method for each of the pages included in the file depending on an analysis result obtained by the performance collection device and update the mapping information in accordance with the memory access method decided for each of the pages.

6. The apparatus according to claim 5, wherein the one or more processors
acquire, for each of the pages, the number of writings on the non-volatile memory within a predetermined period,
decide on the copy access processing when the number of writings is larger than a first threshold value, and
decide on the direct access processing when the number of writings is equal to or smaller than the first threshold value.

7. The apparatus according to claim 2, wherein the one or more processors
analyze operation on the first memory and the non-volatile memory,
decide the memory access method for each of the pages depending on an analysis result at a predefined timing, and
update the mapping information in which the memory access method decided for each of the pages is set.

8. A memory control method adapted to execute operating system to execute information processing on data stored in a first memory and a non-volatile memory, the memory control method comprising:
by a management device, managing by receiving an access request with respect to the first memory and the non-volatile memory from one or more processors and by accessing the first memory and the non-volatile memory; and
by the one or more processors,
allocating, to each of pages included in a file stored in the non-volatile memory, a memory access method that indicates either copy access processing or direct access processing to be executed, the copy access processing performing writing and readout of data copied from the non-volatile memory into the first memory, the direct access processing directly performing writing and readout of data stored in the non-volatile memory; and accessing the non-volatile memory or the first memory by the memory access method allocated to each of the pages included in the file when a request from an application program for writing or readout on the file, wherein the managing by the management device includes,
  storing, for each of the pages, information including an access method that indicates either first access processing or second access processing to be executed, the first access processing performing writing and readout of data copied from the non-volatile memory into the first memory, the second access processing directly performing writing and readout of data stored in the non-volatile memory, and
  performing access processing by
  executing the first access processing when a request for writing or readout is received from the one or more processors for a page that is set to the first access processing, and
  executing the second access processing when a request for writing or readout is received from the one or more processors for a page that is set to the second access processing; and the method by the one or more processors includes,
  determining whether a predetermined update timing has come,
  reading out an access method in a corresponding page in the setting storage when the predetermined update timing has come, and
  for each of the pages included in the file, allocating the copy access processing when the first access processing is set as the access method in the corresponding page in the setting storage, and allocating the direct access processing when the second access processing is set as the access method in the corresponding page in the setting storage.

9. A computer program product including a non-transitory computer-readable medium in which programmed instructions are stored to execute information processing on data stored in a first memory and a non-volatile memory, the programmed instructions causing, a management device to perform managing by receiving an access request with respect to the first memory and the non-volatile memory from one or more processors and by accessing the first memory and the non-volatile memory, wherein the programmed instructions cause the one or more processors to perform:

allocating, to each of pages included in a file stored in the non-volatile memory, a memory access method that indicates either copy access processing or direct access processing to be executed, the copy access processing performing writing and readout of data copied from the non-volatile memory into the first memory, the direct access processing directly performing writing and readout of data stored in the non-volatile memory; and accessing the non-volatile memory or the first memory by the memory access method allocated to each of the pages included in the file when a request from an application program for writing or readout on the file, wherein the managing by the management device includes,
  storing, for each of the pages, information including an access method that indicates either first access processing or second access processing to be executed, the first access processing performing writing and readout of data copied from the non-volatile memory into the first memory, the second access processing directly performing writing and readout of data stored in the non-volatile memory, and
  performing access processing by
  executing the first access processing when a request for writing or readout is received from the one or more processors for a page that is set to the first access processing, and
  executing the second access processing when a request for writing or readout is received from the one or more processors for a page that is set to the second access processing; and the instructions cause the one or more processors to further perform,
  determining whether a predetermined update timing has come;
  reading out an access method in a corresponding page in the setting storage when the predetermined update timing has come, and
  for each of the pages included in the file, allocating the copy access processing when the first access processing is set as the access method in the corresponding page in the setting storage, and allocating the direct access processing when the second access processing is set as the access method in the corresponding page in the setting storage.

* * * * *